(No Model.) 3 Sheets—Sheet 1.

J. KNOOP.
GRAIN HARVESTING MACHINE.

No. 296,843. Patented Apr. 15, 1884.

Attest.
Sidney P. Hollingsworth
Harry Shipley

Inventor.
Josiah Knoop.
By his atty.
Philip T. Dodge.

(No Model.) 3 Sheets—Sheet 2.

J. KNOOP.
GRAIN HARVESTING MACHINE.

No. 296,843. Patented Apr. 15, 1884.

Attest
Sidney P. Hollingsworth
Harry Shipley

Inventor
Josiah Knoop
By his attorney
Philip T. Dodge (No Model.) 3 Sheets—Sheet 3.

J. KNOOP.
GRAIN HARVESTING MACHINE.

No. 296,843. Patented Apr. 15, 1884.

Attest:
Sidney P. Hollingsworth
Harry Shipley

Inventor
Josiah Knoop.
By his atty
Philip T. Dodge

N. PETERS, Photo-Lithographer, Washington, D. C.

UNITED STATES PATENT OFFICE.

JOSIAH KNOOP, OF CASSTOWN, OHIO.

GRAIN-HARVESTING MACHINE.

SPECIFICATION forming part of Letters Patent No. 296,843, dated April 15, 1884.

Application filed July 2, 1883. (No model.)

*To all whom it may concern:*

Be it known that I, JOSIAH KNOOP, of Casstown, in the county of Miami and State of Ohio, have invented certain Improvements in Grain-Harvesting Machines, of which the following is a specification.

The aim of my invention is more particularly to provide a harvester upon which a low level or platform binder may be applied in a simple and practicable manner.

My construction is particularly designed to effect a proper balance of the machine when the binding mechanism and platform are carried in rear of the main driving-wheel, to permit a ready adjustment of the parts, and to secure an automatic adjustment of the reel in relation thereto.

Figure 1:
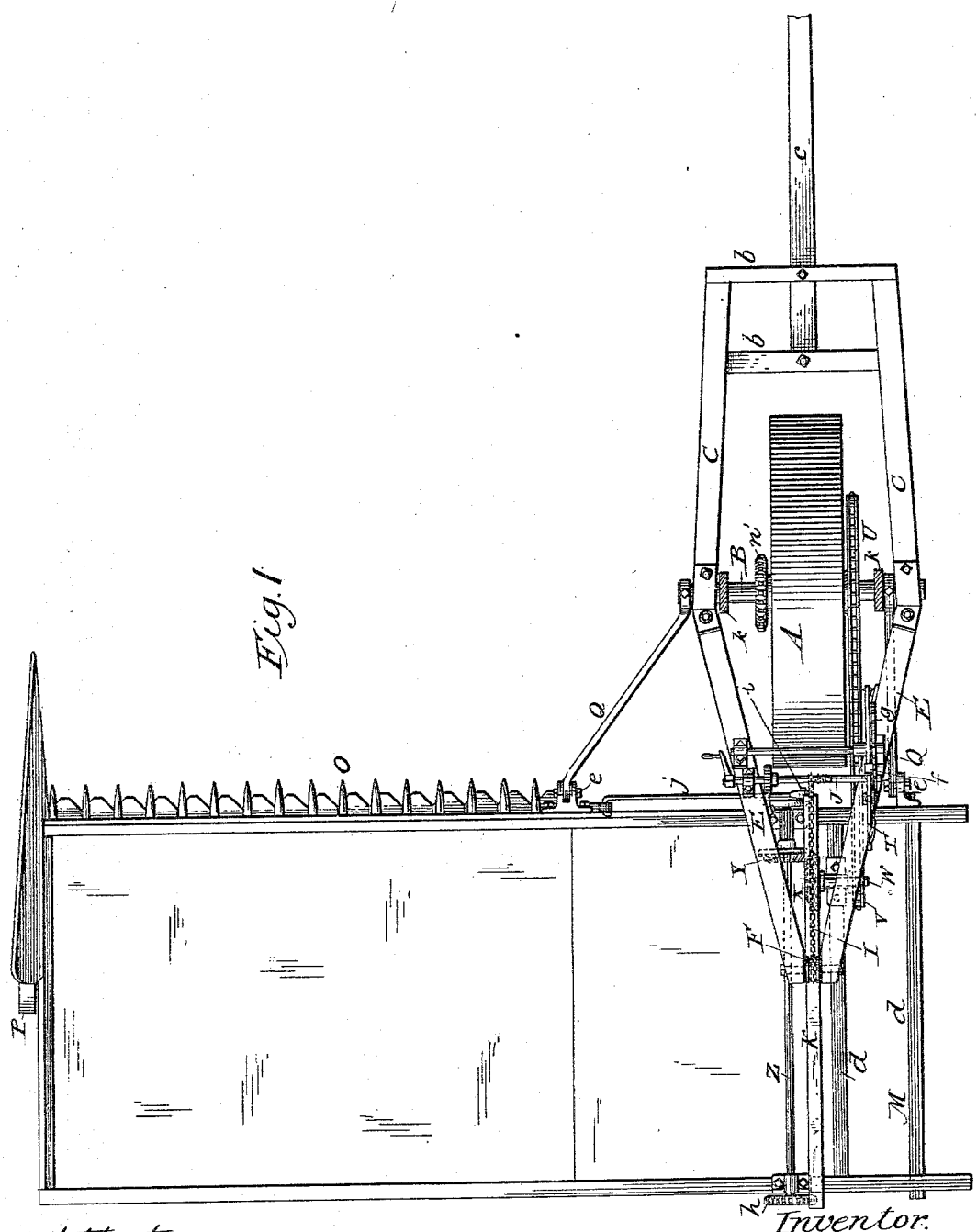
Figure 2:
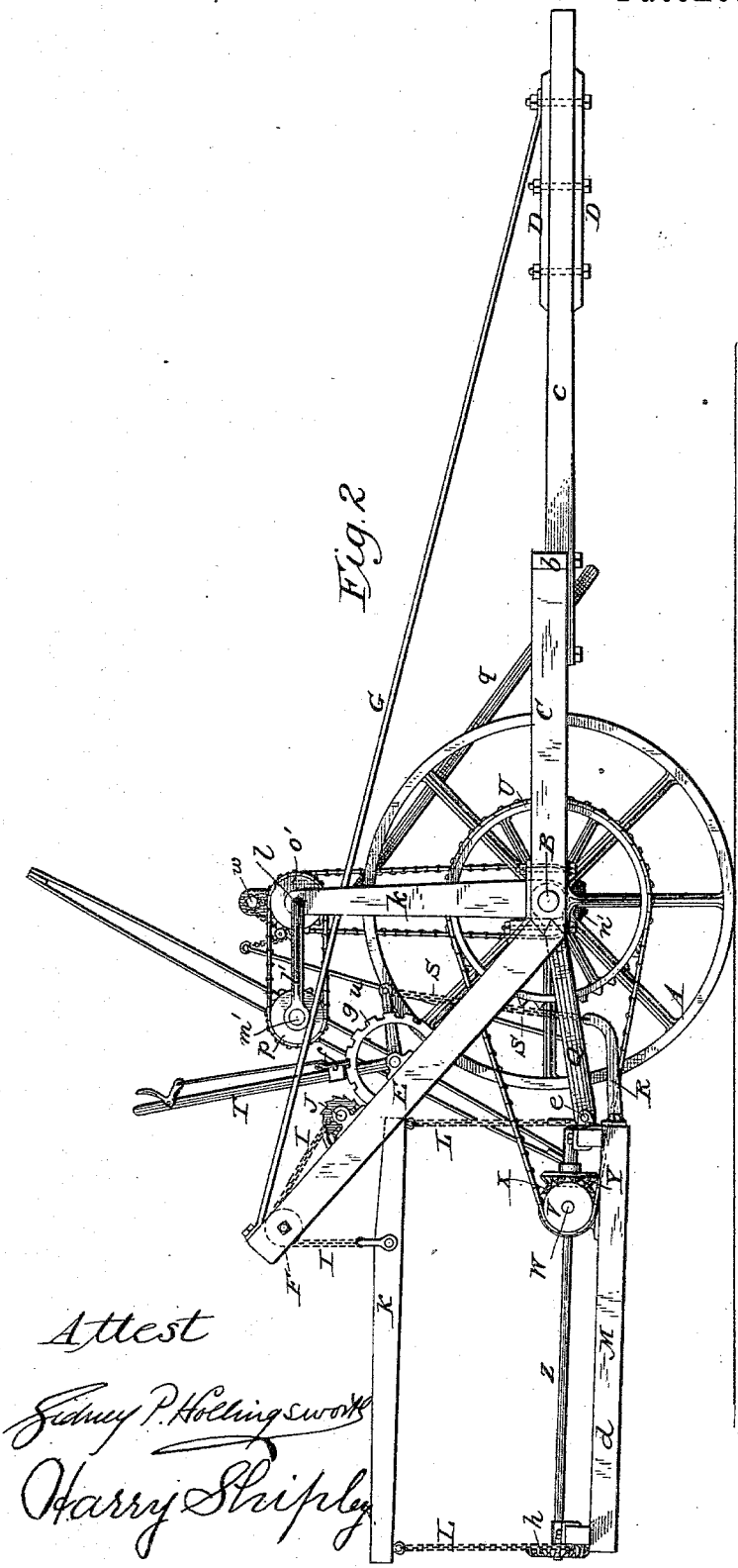
Figure 3:
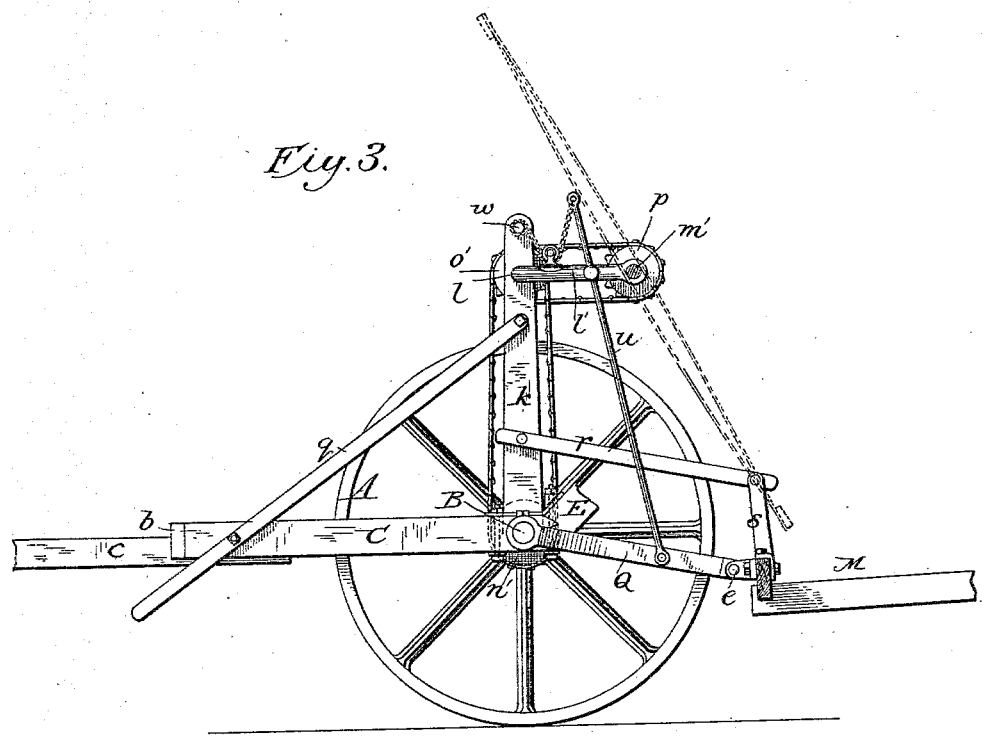
Figure 4:
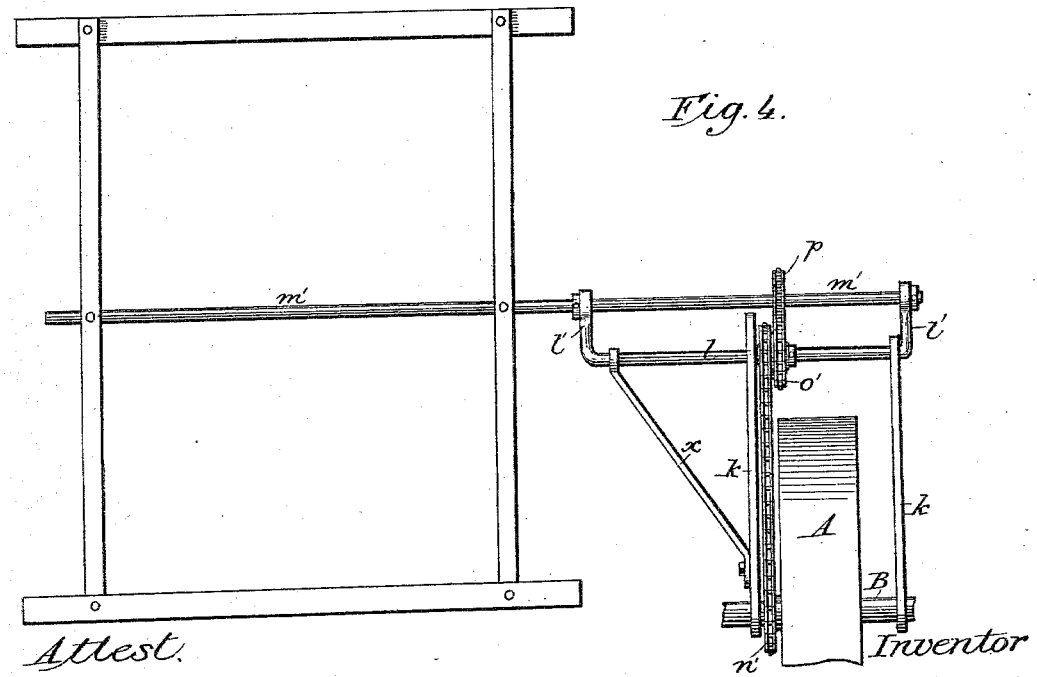

Referring to the accompanying drawings, Figure 1 is a top plan view of my improved machine with the reel omitted; Fig. 2, an elevation of the same, looking against the stubble side. Fig. 3 is an elevation of the main frame and reel-supports, viewed from the grain side. Fig. 4 is an elevation of the reel-supporting and driving mechanism, viewed from the rear side.

Referring to the drawings, A represents the ground or master wheel, upon which the principal portion of the weight is carried, and by which motion is imparted to the various operative parts, as hereinafter explained. This wheel is mounted loosely upon a horizontal axle, B, the ends of which are journaled in a horizontal main frame, C, which consists, essentially, of the two side bars, *a*, mounted upon and extending forward from the ends of the axle, and connected at their forward ends by rigid cross-bars *b* with each other and with a draft tongue or pole, *c*.

To the forward end of the pole or tongue I apply, either permanently or in such manner that it may be adjusted forward and backward, a weight, D, designed to counterpoise the platform and binder located behind the main wheel, as hereinafter explained.

To the rear ends of the main frame I secure rigidly two bars, E, extending upward and rearward therefrom, and united at their rear ends by means of a cross bolt or pin supporting an intermediate pulley, F. These arms E are designed to give support to the chain by which the platform and binder are sustained, as hereinafter explained. They are maintained rigidly in position with respect to the main frame, so as to constitute in effect a part thereof, by means of a rigid rod or brace, G, extending from their upper ends forward, and attached either to the tongue, as shown in the drawings, or to the main frame, if preferred.

Upon the pulley F, I apply a chain, I, one end of which is attached to a winding-shaft, J, or other adjusting and securing device upon the arms, while its opposite depending end is pivoted to a horizontal bar, K, extending fore and aft of the machine, this bar K being provided at its front and rear ends, respectively, with two depending chains, L, which are attached to the front and rear edges of the platform-frame M. It will thus be seen that by means of the intermediate parts the platform-frame is sustained at a point behind or substantially behind the main wheel, and that its weight is thrown directly upon the latter. It will be observed that the platform thus sustained may be raised and lowered bodily with respect to the main frame by adjusting the chain I through the medium of its take-up device J; and, further, that the entire platform is free to rock in a forward and backward direction by a pivotal motion of the bar K upon the lower end of the chain in a vertical direction. It is to be further noted in this connection that the weight of the platform, and of the binder or other parts which may be applied thereto, is counterbalanced by the weight applied to the forward end of the tongue, whereby a proper balance of the machine upon the axle of the main wheel is secured.

So far as the above features are concerned, they may be employed in connection with a platform of any suitable construction, and in connection with intermediate draft devices of any suitable character connecting said platform with the main frame. I prefer, however, to employ the construction clearly represented in Figs. 1 and 2.

The platform-frame consists of timbers framed rigidly together in a flat rectangular form, with two bars, *d d*, at the inner end, extending fore and aft thereof substantially behind the main wheel. The grain-receiving platform is provided at the forward edge with the usual cutting mechanism, O, and is sustained at the outer end by means of an ordinary ground-wheel, P.

The grain-platform, instead of terminating, as usual, at the inner or heel end of the cutter-bar, is elongated or extended inward a considerable distance beyond the heel of the bar, thus affording a grain-receiver or binding-table to receive the grain-binding mechanism, and to give support to the grain during the binding operation.

The draft devices by which the platform-frame is advanced consist, simply, of two arms, Q, attached to opposite ends of the main axle, and extended thence backward to the front edge of the platform-frame, to which they are jointed, as shown at *e*, this arrangement permitting the platform and binder thereon to rise and fall freely with respect to the main frame, and also to rock or tip forward and backward. The joints *e* are preferably located at the forward end of short arms or plates attached to and extending rigidly forward from the front edge of the platform-frame, as shown in Fig. 1, the advantage of this arrangement being that the joint adjacent to the cutter-bar is carried sufficiently forward to prevent it from interfering with the passage of the butts of the grain as they are carried to the binder. The arms Q are preferably attached rigidly to the two ends of the axle, in order that they may assist in maintaining the proper relative position of the harvester-frame and main frame.

The tilting or rocking motion of the platform is effected, and its proper adjustment maintained, as shown in Fig. 2, by means of an arm, R, extended rigidly forward from its front edge, and connected by means of a chain or rod, S, to an angular hand-lever, T, pivoted upon the arms E, and provided with a locking-dog, *f*, arranged to engage in a notched plate, *g*. By moving the hand-lever the arm R is caused to rise and fall, and thus the tilting of the platform is obtained. The locking of the lever causes the parts to remain in the desired position.

For the purpose of imparting motion to the cutter-bar, I provide the main wheel with a large sprocket-wheel, U, and connect the same by a chain with a corresponding wheel, V, mounted on a shaft, W, in the platform-frame. The shaft W is provided with a bevel-gear, X, which drives, in turn, a corresponding gear, Y, secured upon a shaft, Z, which is mounted in and extends fore and aft of the platform-frame, as plainly represented in Fig. 1. This shaft Z is provided at its rear end with a sprocket-wheel, *h*, from which motion will be transmitted through suitable intermediate devices to the binder and grain-conveyer, and is also provided at its forward end with a crank, *i*, from which motion is communicated from a pitman, *j*, to the cutter-bar.

For the purpose of properly reeling the grain to the cutters, I make use of a reel mounted and driven in a manner which I will now explain, the construction being particularly adapted for use in connection with the harvester hereinbefore described. Two upright standards, *k*, are journaled loosely upon opposite ends of the main axle, and support at their upper ends a horizontal rock-shaft, *l*, which shaft is formed with two rigid backwardly-extending arms, *l'*, the rear ends of which give support to the reel-shaft *m'*, the reel being of any ordinary pattern. A sprocket-wheel, *n'*, applied to the main wheel, communicates motion through an intermediate chain to a double sprocket-wheel, *o'*, mounted loosely upon and around the rock-shaft *l*. The wheel *o'* is connected by a second chain with a sprocket-wheel, *p*, on the reel-shaft, motion being in this manner communicated from the main wheel to the reel. The forward and backward motion of the standards *k* upon the main shaft admits of the reel being moved forward and backward, while the rotation of the rock-shaft in the upper ends of the standards will cause its supporting-arms to raise or lower the reel. The forward and backward motion of the reel-standard may be limited, as shown in Fig. 3, by means of a forwardly-extending bar, *q*, pivoted thereto and connected with the main frame by a bolt or other fastening device which will admit of its being adjusted lengthwise. In addition to or in place of this brace *q*, the standards may be also sustained by means of a backwardly-extending brace, *r*, pivoted at one end to one or both of the standards, and at the opposite end to a rigid arm, *s*, rising rigidly from the forward edge of the platform-frame, this bar *r* being made adjustable in length or adjustable endwise at its pivotal points in any suitable manner. When the brace *q* is disconnected, the reel-standard will be thrown forward and backward by means of the bar *r*. When, however, the standard is secured rigidly in position by means of the brace *q*, the bar *r* must be loosened or disconnected, as otherwise it would interfere with the tilting action of the platform.

For the purpose of securing the vertical adjustment of the reel-supporting arms *l'*, a rod or brace, *u*, is pivoted to one of the arms Q, connecting the platform with the main axle, and extending thence upward loosely through a guide or eye on the reel-supporting arm, as shown in Fig. 3. A chain is extended downward from the upper end of this brace *u*, beneath a roller on the arm *l'*, and thence to a winding-shaft, *w*, or other take-up device, mounted either upon the arm, its shaft, or the supporting-standard *k*. By adjusting the chain the reel-arms may be raised or lowered and fixed in the required position.

The connection of the brace by which the supporting-arms l' are sustained to the bar Q is a feature of special importance, inasmuch as it causes the rising and falling motion of the platform to effect a corresponding vertical adjustment of the reel, thus maintaining a substantially uniform distance between the reel and the cutters. The essential feature of the invention in this regard consists in uniting the reel-supports sustained upon the main frame with the platform by intermediate connections, which will cause the reel and platform to rise and fall in unison.

For the purpose of giving overhead support to the reel-shaft, it is preferred to extend the rock-shaft by which it is sustained inward, as shown in Fig. 4, a considerable distance beyond the standards $k$, and to sustain this overhanging end of the rock-shaft by means of a diagonal brace, $x$, extending upward from one of the standards, as shown in Fig. 4.

By the term "overhead suspension devices," as herein used, is meant devices located above the level at which the grain is carried through the machine.

The present invention is restricted to those matters and things which are hereinafter claimed; and as to all matters which may be described or shown, but which are not claimed, the right is reserved to make the same the subject-matter of a separate application.

Having thus described my invention, what I claim is—

1. In a harvesting-machine, the combination of a ground-wheel, a main frame supported thereon, a harvester-platform suspended from said frame in rear of the wheel, and a counter-balance applied to the frame in advance of the wheel.

2. The combination of the main wheel, the main frame provided with the elevated rear extension, the platform-frame, and suspension devices, substantially as described, connecting said platform-frame with the rear extension of the main frame, as described.

3. The combination of the wheeled main frame having an overhead extension behind the wheel, the platform-frame, the bar K, suspended at an intermediate point from the main frame above the platform-frame, and suspending devices extending from the opposite ends of said bar to the platform-frame, as described.

4. The combination of the main wheel, the main frame, the rearwardly and upwardly extending arms E, and the brace G.

5. In combination with the wheeled main frame having the rear extension, the platform-frame suspended by overhead connections from the rear end of the main frame, and means, substantially as described, for effecting the tilting or rocking motion of said platform-frame in a forward and backward direction.

6. In a harvesting-machine, a platform or receiver connected at its front and rear edges by suspending devices to opposite ends of a sustaining-bar, said bar being pivotally supported at an intermediate point in its length, substantially as described, whereby the rocking or tilting motion of the platform is permitted.

7. The combination of the main frame and its elevated rear extension, the platform, the suspending-chains L, bar K, suspending-chain I, and means, substantially as described, for effecting the adjustment of said chain.

8. In combination with the wheeled frame having the elevated extension at its rear, the grain-platform, the overhead suspending devices connecting said platform with the main frame, and the hand-lever T, connected by means substantially as described with the forward edge of the platform.

9. In combination with the main wheel and the main frame having an overhead extension at its rear, the platform, means, substantially as described, for suspending said platform at its front and rear edges from the overhanging frame, and draft-arms Q, extending backward from the ends of the main axle and jointed to the forward edge of the platform.

10. In combination with the wheeled main frame, the platform-frame arranged to rise and fall in relation thereto, the vertically-adjustable reel supported upon the main frame or its axle, and devices, substantially as shown, connecting the platform and reel, whereby the reel is caused to rise and fall in unison with the platform.

11. In combination with the wheeled main frame, the standards, the reel-supporting arms jointed thereto, the connecting-arms Q, and the brace $u$, extending from the arms Q to the reel-sustaining arms, whereby the vertical movement of the platform is caused to produce a like movement of the reel.

12. In combination with the main frame and the vertically-swinging reel-support thereon, the vertically-movable platform, the rods $u$, and adjustable devices, substantially as shown, connecting said rod with the reel-supporting arms, whereby the vertical adjustment of the reel may be effected independently of its automatic movement.

13. In combination with the wheeled main frame and the reel-standards, the platform, the upright arm $s$, and the rod or brace $r$, connecting said arm with the standards.

JOSIAH KNOOP.

Witnesses:
H. P. McDOWELL,
M. T. McDOWELL.